United States Patent
Chung et al.

(10) Patent No.: US 10,275,630 B2
(45) Date of Patent: Apr. 30, 2019

(54) FINGERPRINT IDENTIFICATION APPARATUS

(71) Applicant: Gingy Technology Inc., Hsinchu (TW)

(72) Inventors: Chuck Chung, Hsinchu (TW); Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 16/200,656

(22) Filed: Nov. 27, 2018

(65) Prior Publication Data

US 2019/0095677 A1 Mar. 28, 2019

Related U.S. Application Data (60) Division of application No. 15/989,123, filed on May 24, 2018, which is a continuation-in-part of application No. 15/239,842, filed on Aug. 18, 2016, now Pat. No. 10,049,256.

(60) Provisional application No. 62/266,002, filed on Dec. 11, 2015, provisional application No. 62/563,045, filed on Sep. 25, 2017, provisional application No. 62/574,222, filed on Oct. 19, 2017, provisional application No. 62/620,985, filed on Jan. 23, 2018.

(30) Foreign Application Priority Data

| Jul. 18, 2016 | (TW) | ............................. 105122567 A |
| Sep. 20, 2017 | (CN) | ......................... 2017 1 0852899 |
| Mar. 1, 2018 | (CN) | ..................... 2018 2 0286719 U |

(51) Int. Cl.
*G02B 27/30* (2006.01)
*G06K 9/00* (2006.01)
*G06F 3/041* (2006.01)
*G06K 9/20* (2006.01)

(52) U.S. Cl.
CPC ......... *G06K 9/00013* (2013.01); *G02B 27/30* (2013.01); *G06F 3/041* (2013.01); *G06K 9/00087* (2013.01); *G06K 9/2036* (2013.01)

(58) Field of Classification Search
CPC ............ G06K 9/0004; G06K 9/00053; G06K 2009/0006; G09G 3/3225; G02B 27/30; H01L 27/3234
See application file for complete search history.

(56) References Cited

U.S. PATENT DOCUMENTS

| 2016/0132712 | A1* | 5/2016 | Yang | .................... G06K 9/0002 348/77 |
| 2016/0224816 | A1* | 8/2016 | Smith | .................... G02B 27/58 |
| 2017/0351898 | A1* | 12/2017 | Zhang | ....................... G06K 9/00 |

* cited by examiner

Primary Examiner — Michael Pervan
(74) Attorney, Agent, or Firm — JCIPRNET

(57) ABSTRACT

A fingerprint identification apparatus including a light-transmitting device, an image-capture device disposed opposite to the light-transmitting device, and a collimator disposed between the light-transmitting device and the image-capture device is provided. The collimator includes a plurality of light-shielding layers and a plurality of light-transmitting layers that are alternately stacked. Each of the light-shielding layers has a plurality of openings respectively corresponding to a plurality of pixel regions of the image-capture device. Openings of the plurality of light-shielding layers corresponding to one pixel region are arranged along an oblique direction. The oblique direction and a normal direction of a pressing surface of the light-transmitting device have an included angle θ, and 0°<θ<90°.

6 Claims, 12 Drawing Sheets

FINGERPRINT IDENTIFICATION APPARATUS

CROSS-REFERENCE TO RELATED APPLICATION

This application is a divisional application of and claims the priority benefit of U.S. application Ser. No. 15/989,123, filed on May 24, 2018, now allowed. The prior U.S. application Ser. No. 15/989,123 is a continuation-in-part application of and claims the priority benefit of U.S. application Ser. No. 15/239,842, filed on Aug. 18, 2016, now patented, which claims the priority benefits of U.S. provisional application Ser. No. 62/266,002, filed on Dec. 11, 2015, and Taiwan application serial no. 105122567, filed on Jul. 18, 2016. The prior U.S. application Ser. No. 15/989,123 also claims the priority benefits of U.S. provisional application Ser. No. 62/563,045, filed on Sep. 25, 2017, U.S. provisional application Ser. No. 62/574,222, filed on Oct. 19, 2017, U.S. provisional application Ser. No. 62/620,985, filed on Jan. 23, 2018, China application serial no. 201710852899.3, filed on Sep. 20, 2017, and China application serial no. 201820286719.X, filed on Mar. 1, 2018. The entirety of each of the above-mentioned patent applications is hereby incorporated by reference herein and made a part of this specification.

BACKGROUND OF THE INVENTION

Field of the Invention

The invention relates to an optical apparatus, and more particularly, to a fingerprint identification apparatus.

Description of Related Art

The types of biometrics include, for instance, facial, vocal, iris, retinal, veinal, and fingerprint identification. Since the fingerprint of every individual is unique, and the fingerprint does not readily change with age or health conditions, a fingerprint identification apparatus has become the most common biometrics identification apparatus. Based on different sensing methods, the fingerprint identification apparatus can be further divided into, for instance, optical, capacitive, ultrasonic, and thermal induction.

An optical fingerprint identification apparatus can obtain a fingerprint image using the principle of total reflection, and the working principle thereof is as follows. The fingerprint is formed by a plurality of irregular ridges (i.e., peaks) and recesses (i.e., valleys). When a finger is pressed on the fingerprint identification apparatus, the peaks of the fingerprint are in contact with a light-transmitting device of the fingerprint identification apparatus, and the valleys of the fingerprint are not in contact with the light-transmitting device of the fingerprint identification apparatus. The fingerprint peaks in contact with the light-transmitting device destroy the total reflection of a sensing light beam in the light-transmitting device, and therefore the image-capture device obtains dark lines corresponding to the fingerprint peaks. At the same time, the valleys of the fingerprint do not destroy the total reflection of the beam in the light-transmitting device, and therefore the image-capture device obtains bright lines corresponding to the fingerprint valleys. Accordingly, the beam corresponding to the peak protrusions and the valleys of the fingerprint forms a light and dark stripe pattern on the image-capture device, and therefore the image-capture device obtains a fingerprint image. Information corresponding to the fingerprint image is calculated using an algorithm to identify the user. However, in prior art, under the irradiation of intense ambient beam (such as sunlight), the ambient beam is readily transmitted to the image-capture device of the fingerprint identification apparatus and interferes with the image-capture quality of the fingerprint.

SUMMARY OF THE INVENTION

The invention provides a fingerprint identification apparatus with good imaging quality.

A fingerprint identification apparatus of the invention includes a light-transmitting device having a pressing surface, an image-capture device disposed opposite to the light-transmitting device and having a plurality of pixel regions, and a collimator disposed between the light-transmitting device and the image-capture device. The collimator includes a plurality of light-shielding layers and a plurality of light-transmitting layers that are alternately stacked. Each of the light-shielding layers has a plurality of openings respectively corresponding to the plurality of pixel regions. Openings of the plurality of light-shielding layers corresponding to one pixel region are arranged along an oblique direction. The oblique direction and a normal direction of a pressing surface of the light-transmitting device have an included angle $\theta$, and $0°<\theta<90°$.

In an embodiment of the invention, the oblique direction and the normal direction of the pressing surface of the light-transmitting device have an included angle $\theta$ between $35°$ and $85°$.

In an embodiment of the invention, the plurality of openings of one of the light-shielding layers are arranged at a spacing P, at least one opening of the light-shielding layer has a diameter D, the light-shielding layer is disposed on a light-transmitting layer, the light-transmitting layer has a thickness H, and the diameter D, the spacing P, and the thickness H satisfy:

$$\left(\frac{H}{P-D}\right) \le 0.5.$$

In an embodiment of the invention, the light-shielding layer is one light-shielding layer of the plurality of light-shielding layers of the collimator closest to the pressing surface, and the light-transmitting layer is one light-transmitting layer of the plurality of light-transmitting layers of the collimator closest to the pressing surface.

In an embodiment of the invention, the light-shielding layer is one light-shielding layer of the plurality of light-shielding layers of the collimator closest to the image-capture device, and the light-transmitting layer is one light-transmitting layer of the plurality of light-transmitting layers of the collimator closest to the image-capture device.

In an embodiment of the invention, diameters of the plurality of openings corresponding to one pixel region are gradually increased away from the image-capture device.

In an embodiment of the invention, diameters of the plurality of openings corresponding to the one pixel region are gradually decreased away from the image-capture device.

In an embodiment of the invention, diameters of the plurality of openings corresponding to the one pixel region are substantially identical.

In an embodiment of the invention, the plurality of openings of the plurality of different light-shielding layers are arranged at equal spacing.

In an embodiment of the invention, thicknesses of at least two light-transmitting layers are different.

In an embodiment of the invention, the plurality of openings of one light-shielding layer of the plurality of light-shielding layers of the collimator closest to the image-capture device is respectively aligned with the plurality of pixel regions of the image-capture device, and the plurality of openings of the other light-shielding layers of the collimator are not aligned with the plurality of pixel regions of the image-capture device.

Another fingerprint identification apparatus of the invention includes a light-transmitting device, an image-capture device, and a collimator. The light-transmitting device has a pressing surface. The image-capture device is disposed opposite to the light-transmitting device and has a plurality of pixel regions. The collimator is disposed between the light-transmitting device and the image-capture device. The collimator has a plurality of first optical channels and a plurality of second optical channels, wherein the first optical channels are extended in a first oblique direction, the first oblique direction and a normal direction of the pressing surface have an included angle θ1, 0°<θ1<90°, the second optical channels are extended in a second oblique direction, the second oblique direction and the normal direction of the pressing surface have an included angle θ2, 0°<θ2<90°, and the first oblique direction and the second oblique direction are staggered.

In an embodiment of the invention, a sensing light beam passes through the first optical channels to be transmitted toward a finger located on the pressing surface; and the sensing light beam from the pressing surface passes through the second optical channels to be transmitted to the pixel regions of the image-capture device.

In an embodiment of the invention, 35°<θ1<85°.

In an embodiment of the invention, 35°<θ2<85°.

In an embodiment of the invention, the included angle θ1 and the included angle θ2 are different.

In an embodiment of the invention, the image-capture device includes a light-transmitting carrier and a plurality of photoelectric conversion structures. The light-transmitting carrier has the pixel regions. The photoelectric conversion structures are disposed in the pixel regions of the light-transmitting carrier.

Based on the above, the fingerprint identification apparatus of an embodiment of the invention includes a plurality of light-shielding layers. In particular, the plurality of openings of the plurality of light-shielding layers corresponding to one pixel region are arranged along an oblique direction. The plurality of openings of the plurality of light-shielding layers arranged along the oblique direction forms a plurality of optical channels. Since the optical channels are obliquely disposed, an ambient beam does not readily pass through the optical channels and is transmitted to the image-sensing device. Accordingly, the ambient beam does not readily interfere with the fingerprint information carried by the sensing light beam, and therefore fingerprint image-capture quality can be increased.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Hereinafter, exemplary embodiments of the invention are described in detail, and examples of the exemplary embodiment are conveyed via the figures. Wherever possible, the same reference numerals are used in the drawings and the descriptions to refer to the same or similar portions.

Figure 1:
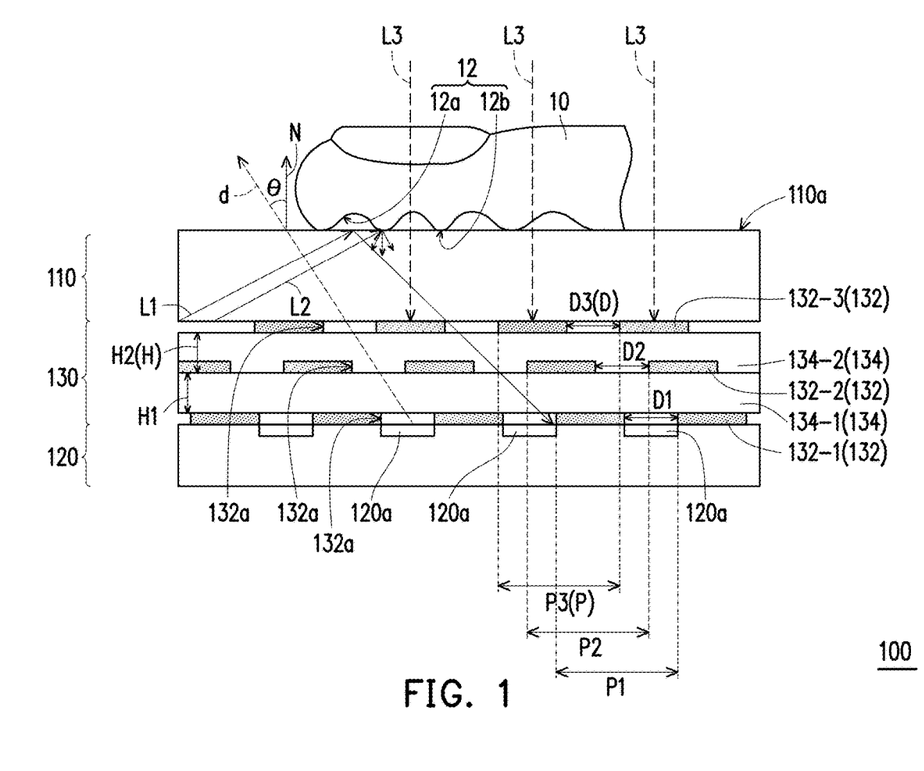
FIG. 1 is a cross section of a fingerprint identification apparatus of an embodiment of the invention.

FIG. 1 is a cross section of a fingerprint identification apparatus of an embodiment of the invention. Referring to FIG. 1, a fingerprint identification apparatus 100 is configured to obtain a fingerprint 12 image. The fingerprint identification apparatus 100 includes a light-transmitting device 110, an image-capture device 120 disposed opposite to the light-transmitting device 110, and a collimator 130 disposed between the light-transmitting device 110 and the image-capture device 120. In any embodiment of the invention, the light-transmitting device 110 can be a cover, a touch device, a display device, a light-transmitting plate, a light-guide plate, or a combination thereof, and the invention is not limited thereto. The image-capture device 120 is configured to receive sensing light beams L1 and L2 and convert the sensing light beams L1 and L2 into electric signals. In other words, the image-capture device 120 is a photoelectric sensor such as a charge-coupled device (CCD) or complementary metal oxide semiconductor (CMOS), but the invention is not limited thereto.

The fingerprint identification apparatus 100 further includes a light source (not shown) configured to emit the sensing light beams L1 and L2. In the present embodiment, the light source is, for instance, a light-emitting diode, but the invention is not limited thereto. In the present embodiment, the sensing light beams L1 and L2 can be transmitted to a pressing surface 110a via the light-transmitting device 110. The fingerprint 12 of a finger 10 located on the pressing surface 110a has a valley 12a and a peak 12b. When a portion of the sensing light beam L1 is incident on a portion of the pressing surface 110a corresponding to the valley 12a, the total reflection of the portion of the sensing light beam L1 is not destroyed and then is obliquely incident on a corresponding pixel region 120a. When a portion of the sensing light beam L2 is incident on a portion of the pressing surface 110a corresponding to the peak 12b, the total reflection of the portion of the sensing light beam L2 is destroyed and scattered, and then is incident on the corresponding pixel region 120a. The energy of the portion of the sensing light beam L1 incident on the pixel region 120a and corresponding to the valley 12a is strong, the energy of the sensing light beam L2 incident on the pixel region 120a and corresponding to the peak 12b is weak, and therefore the image-capture device 120 can capture a light and dark fingerprint 12 image.

The collimator 130 includes a plurality of light-shielding layers 132 and a plurality of light-transmitting layers 134. The plurality of light-shielding layers 132 and the plurality of light-transmitting layers 134 are alternately stacked. Each of the light-shielding layers 132 has a plurality of openings 132a respectively corresponding to the plurality of pixel regions 120a of the image-capture device 120. For instance, in the present embodiment, the collimator 130 can optionally include three light-shielding layers 132-1, 132-2, and 132-3 and two light-transmitting layers 134-1 and 134-2, wherein the light-shielding layer 132-1, the light-transmitting layer 134-1, the light-shielding layer 132-2, the light-transmitting layer 134-2, and the light-shielding layer 132-3 are arranged from the image-capture device 120 toward the light-transmitting device 110 in order.

It should be mentioned that, the number of the light-shielding layer 132 and the number of the light-transmitting layer 134 above and shown in the figures are only exemplary to the invention and are not intended to limit the invention. According to other embodiments, the number of the light-shielding layer 132 and the number of the light-transmitting layer 134 of the collimator 130 can also be designed as other suitable numbers based on actual need.

It should be mentioned that, openings 132a of the plurality of light-shielding layers 132-1, 132-2, and 132-3 corresponding to one pixel region 120a is arranged along an oblique direction d, the oblique direction d and a normal direction N of the pressing surface 110a have an included angle θ, and 0°<θ<90°. For instance, in the present embodiment, preferably, 35°<θ<85°. Specifically, in the present embodiment, θ can equal to 60°, but the invention is not limited thereto.

In the present embodiment, the plurality of openings 132a of one light-shielding layer 132-1 of the plurality of light-shielding layers 132 of the collimator 130 closest to the image-capture device 120 are respectively aligned with the plurality of pixel regions 120a of the image-capture device 120, and openings 132a of the other light-shielding layers 132-2 and 132-3 of the collimator 130 are not aligned with the plurality of pixel regions 120a of the image-capture device 120 and is offset toward the same side (such as toward the left), wherein the degree of offset of the plurality of openings 132a of the light-shielding layers 132-2 and 132-3 farther from the image-capture device 120 is greater compared to the plurality of corresponding pixel regions 120a. In another embodiment of the invention, the plurality of openings 132a of one light-shielding layer 132-1 in the plurality of light-shielding layers 132 of the collimator 130 closest to the image-capture device 120 is respectively not aligned with the plurality of pixel regions 120a of the image-capture device 120 (for instance, the opening of the light-shielding layer 132-1 is slightly less than the pixel region 120a), but the invention is not limited thereto.

It should be mentioned that, the plurality of openings 132a of the plurality of light-shielding layers 132-1, 132-2, and 132-3 arranged along the oblique direction d forms a plurality of optical channels, and since the optical channels are obliquely disposed, an ambient beam L3 (such as sunlight) substantially perpendicularly incident on the pressing surface 110a does not readily pass through the optical channels and is transmitted to the image-sensing element 120. Accordingly, the ambient beam L3 does not readily interfere with the fingerprint 12 information carried by the sensing light beams L1 and L2, such that the fingerprint 12 image quality can be significantly increased.

In the present embodiment, the plurality of openings 132a of the plurality of different light-shielding layers 132 are arranged at equal spacing. Specifically, the plurality of openings 132a of the light-shielding layer 132-1 are arranged at a spacing P1, the plurality of openings 132a of the light-shielding layer 132-2 are arranged at a spacing P2, the plurality of openings 132a of the light-shielding layer 132-3 are arranged at a spacing P3, and the spacing P1, the spacing P2, and the spacing P3 can substantially be the same. For instance, in the present embodiment, the spacing P1, the spacing P2, and the spacing P3 can all be 50 µm, but the invention is not limited thereto.

In the present embodiment, the diameter of openings 132a corresponding to one pixel region 120a can be substantially identical. In other words, one opening 132a of the light-shielding layer 132-1, one opening 132a of the light-shielding layer 132-2, and one opening 132a of the light-shielding layer 132-3 correspond to one pixel region 120a, one opening 132a of the light-shielding layer 132-1 has a diameter D1, one opening 132a of the light-shielding layer 132-2 has a diameter D2, and one opening 132a of the light-shielding layer 132-3 has a diameter D3, and the diameter D1, the diameter D2, and the diameter D3 are substantially one, but the invention is not limited thereto. For instance, the diameter D1, the diameter D2, and the diameter D3 can be 15 µm, but the invention is not limited thereto. Moreover, in the present embodiment, a thickness H1 of the light-transmitting layer 134-1 and a thickness H2 of the light-transmitting layer 134-2 can be identical. For instance, the thickness H1 of the light-transmitting layer 134-1 and the thickness H2 of the light-transmitting layer 134-2 can both be 50 µm, but the invention is not limited thereto.

Figure 2:
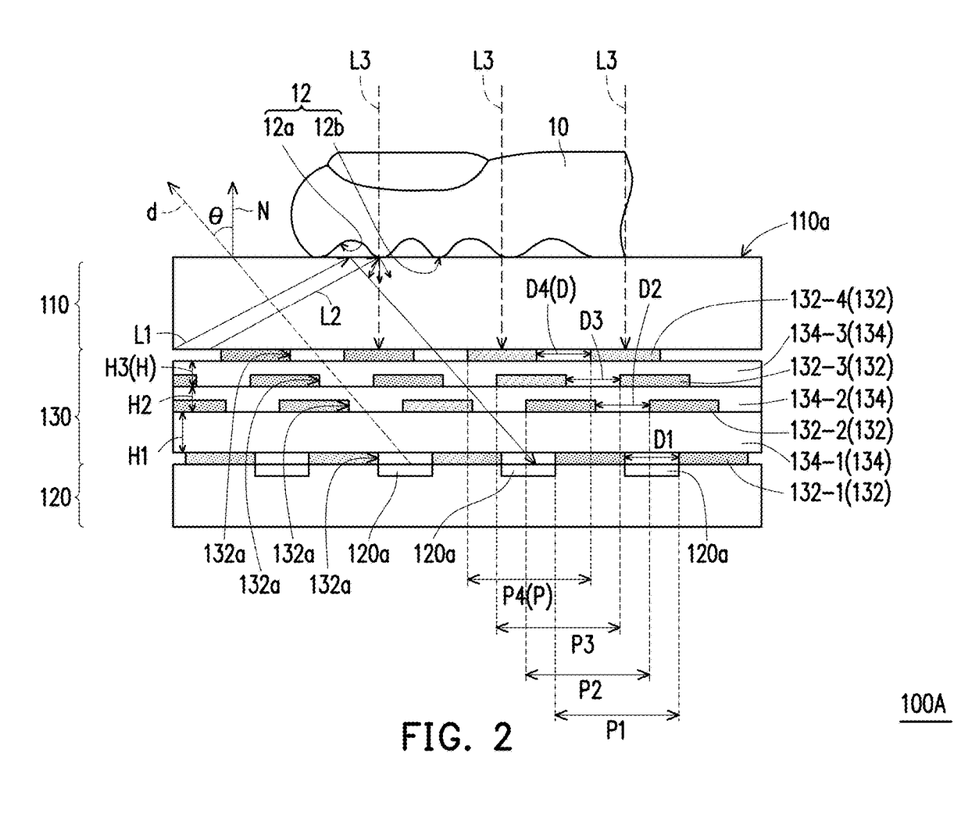
FIG. 2 is a cross section of a fingerprint identification apparatus of another embodiment of the invention.

FIG. 2 is a cross section of a fingerprint identification apparatus of another embodiment of the invention. Referring to FIG. 1 and FIG. 2, a fingerprint identification apparatus 100A is similar to the fingerprint identification apparatus 100, and one or similar portions of the two are provided above and not repeated herein. The main difference between the fingerprint identification apparatus 100A and the fingerprint identification apparatus 100 is that the fingerprint identification apparatus 100A further includes a light-transmitting layer 134-3 and a light-shielding layer 132-4, wherein the light-shielding layer 132-1, the light-transmitting layer 134-1, the light-shielding layer 132-2, the light-transmitting layer 134-2, the light-shielding layer 132-3, the light-transmitting layer 134-3, and the light-shielding layer 132-4 are arranged from the image-capture device 120 toward the light-transmitting device 110 in order.

In the present embodiment, the plurality of openings 132a of the light-shielding layer 132-1 are arranged at a spacing P1, the plurality of openings 132a of the light-shielding layer 132-2 are arranged at a spacing P2, the plurality of openings 132a of the light-shielding layer 132-3 are arranged at a spacing P3, the plurality of openings 132a of the light-shielding layer 132-4 are arranged at a spacing P4, and the spacing P1, the spacing P2, the spacing P3, and the spacing P4 can be substantially identical. For instance, in the present embodiment, the spacing P1, the spacing P2, the spacing P3, and the spacing P4 can all be 50 μm, but the invention is not limited thereto.

In the present embodiment, one opening 132a of the light-shielding layer 132-1 has a diameter D1, one opening 132a of the light-shielding layer 132-2 has a diameter D2, one opening 132a of the light-shielding layer 132-3 has a diameter D3, one opening 132a of the light-shielding layer 132-4 has a diameter D4, and the diameter D1, the diameter D2, the diameter D3, and the diameter D4 can be substantially identical. For instance, in the present embodiment, the diameter D1, the diameter D2, the diameter D3, and the diameter D4 can all be 15 μm, but the invention is not limited thereto.

In the present embodiment, the thickness H1 of the light-transmitting layer 134-1, the thickness H2 of the light-transmitting layer 134-2, and the thickness H3 of the light-transmitting layer 134-3 are not identical. For instance, the thickness H1 of the light-transmitting layer 134-1, the thickness H2 of the light-transmitting layer 134-2, and the thickness H3 of the light-transmitting layer 134-3 can respectively be 50 μm, 25 μm, and 25 μm, but the invention is not limited thereto. Moreover, in the present embodiment, θ can equal to 60°, but the invention is not limited thereto.

Figure 3:
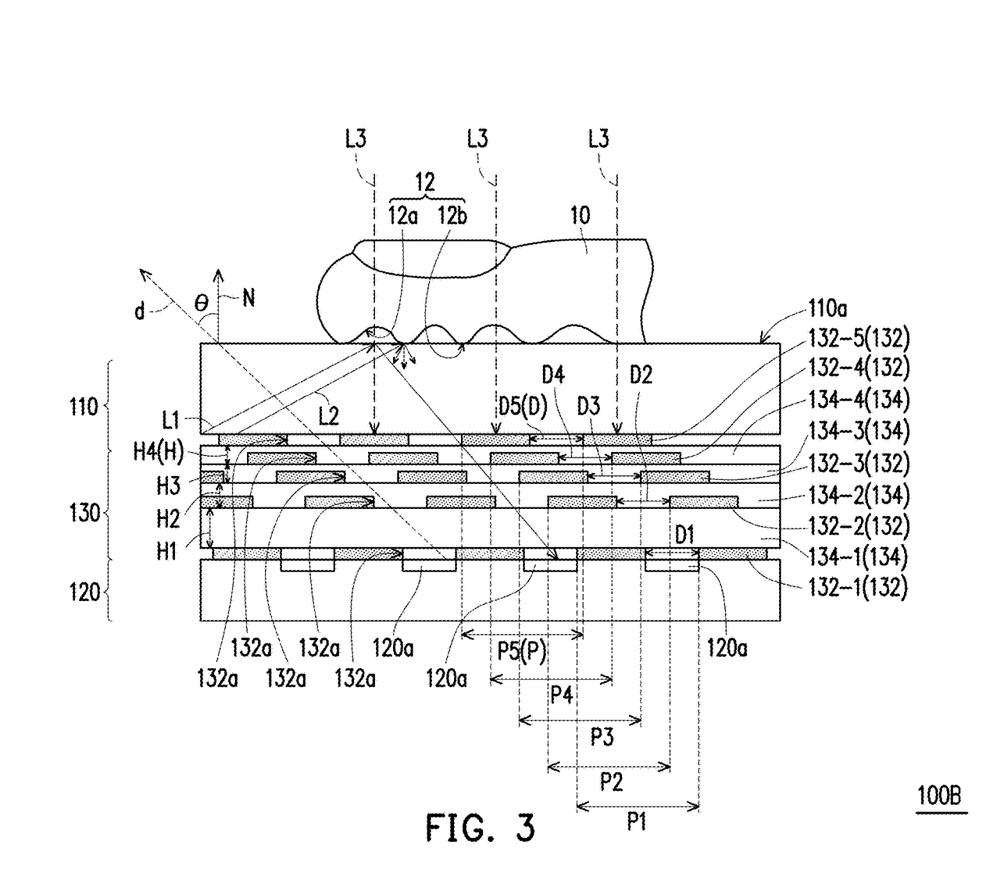
FIG. 3 is a cross section of a fingerprint identification apparatus of yet another embodiment of the invention.

FIG. 3 is a cross section of a fingerprint identification apparatus of yet another embodiment of the invention. Referring to FIG. 2 and FIG. 3, a fingerprint identification apparatus 100B is similar to the fingerprint identification apparatus 100A, and one or similar portions of the two are provided above and not repeated herein. The main difference between the fingerprint identification apparatus 100B and the fingerprint identification apparatus 100A is that the fingerprint identification apparatus 100B further includes a light-transmitting layer 134-4 and a light-shielding layer 132-5, wherein the light-shielding layer 132-1, the light-transmitting layer 134-1, the light-shielding layer 132-2, the light-transmitting layer 134-2, the light-shielding layer 132-3, the light-transmitting layer 134-3, the light-shielding layer 132-4, the light-transmitting layer 134-4, and the light-shielding layer 132-5 are arranged from the image-capture device 120 toward the light-transmitting device 110 in order.

In the present embodiment, the plurality of openings 132a of the light-shielding layer 132-1 are arranged at a spacing P1, the plurality of openings 132a of the light-shielding layer 132-2 are arranged at a spacing P2, the plurality of openings 132a of the light-shielding layer 132-3 are arranged at a spacing P3, the plurality of openings 132a of the light-shielding layer 132-4 are arranged at a spacing P4, the plurality of openings 132a of the light-shielding layer 132-5 are arranged at a spacing P5, and the spacing P1, the spacing P2, the spacing P3, the spacing P4, and the spacing P5 can be substantially identical, but the invention is not limited thereto. For instance, the spacing P1, the spacing P2, the spacing P3, the spacing P4, and the spacing P5 can all be 50 μm, but the invention is not limited thereto.

In the present embodiment, one opening 132a of the light-shielding layer 132-1 has a diameter D1, one opening 132a of the light-shielding layer 132-2 has a diameter D2, one opening 132a of the light-shielding layer 132-3 has a diameter D3, one opening 132a of the light-shielding layer 132-4 has a diameter D4, one opening 132a of the light-shielding layer 132-5 has a diameter D5, and the diameter D1, the diameter D2, the diameter D3, the diameter D4, and the diameter D5 can be substantially identical. For instance, the diameter D1, the diameter D2, the diameter D3, the diameter D4, and the diameter D5 can all be 15 μm, but the invention is not limited thereto.

In the present embodiment, the thickness H1 of the light-transmitting layer 134-1, the thickness H2 of the light-transmitting layer 134-2, the thickness H3 of the light-transmitting layer 134-3, and the thickness H4 of the light-transmitting layer 134-4 can respectively be 50 μm, 25 μm, 12.5 μm, and 12.5 μm, but the invention is not limited thereto. Moreover, in the present embodiment, θ can equal to 60°, but the invention is not limited thereto.

It should be mentioned that, in the present embodiment, the plurality of openings 132a of the light-shielding layer 132-5 are arranged at a spacing P (such as 50 μm), one opening 132a of the light-shielding layer 132-5 has a diameter D (such as 15 μm), the light-shielding layer 132-5 is disposed on the light-transmitting layer 134-4, the light-transmitting layer 134-4 has a thickness H (such as 12.5 μm), and the diameter D, the spacing P, and the thickness H satisfy the following formula (1):

$$\left(\frac{H}{P-D}\right) \leq 0.5.$$

In the present embodiment, the diameter D of formula (1) can refer to the diameter D5 of one opening 132a of the light-shielding layer 132-5, the spacing P of formula (1) can refer to the spacing P5 of a plurality of openings 132a of the light-shielding layer 132-5, and the thickness H of formula (1) can refer to the thickness H4 of the light-transmitting layer 134-4, wherein the light-shielding layer 132-5 is one light-shielding layer of the plurality of light-shielding layers 132-1, 132-2, 132-3, 132-4, and 132-5 of the collimator 130 closest to the pressing surface 110a, and the light-transmitting layer 132-4 is one light-transmitting layer 134-2 of the plurality of light-transmitting layers 134-1, 134-2, 132-3, and 132-4 of the collimator 130 closest to the pressing surface 110a. However, the invention is not limited thereto, and in other embodiments, the diameter D of formula (1) can also refer to the diameter D1 of one opening 132a closest to one light-shielding layer 132-1 of the image-capture device 120, the spacing P of formula (1) can also refer to the spacing P1 of the plurality of openings 132a closest to one light-shielding layer 132-1 of the image-capture device 120, and the thickness T of formula (1) can also refer to the thickness H1 of one light-transmitting layer 134-1 closest to the image-capture device 120.

When the diameter D, the spacing P, and the thickness H satisfy formula (1), the fingerprint identification apparatus 100B can alleviate the issue of cross-talk so as to obtain a fingerprint 12 image with good quality. Description is provided in the following with reference to FIG. 4 to FIG. 6.

Figure 4:
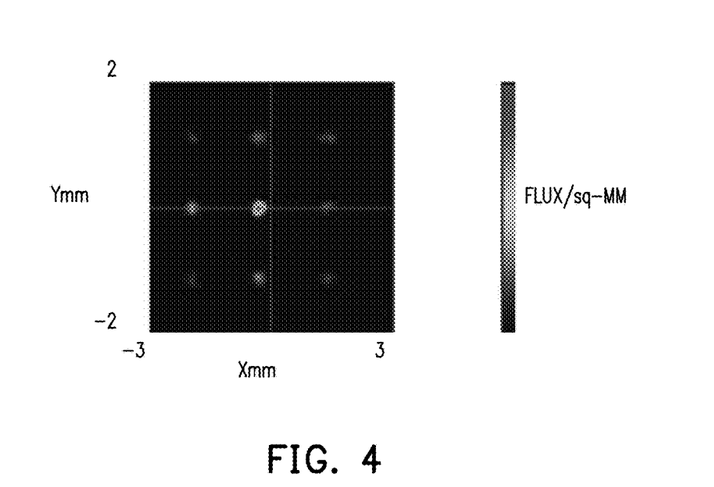
FIG. 4 is a simulated light distribution on a plurality of pixel regions of the fingerprint identification apparatus of FIG. 1.
Figure 5:
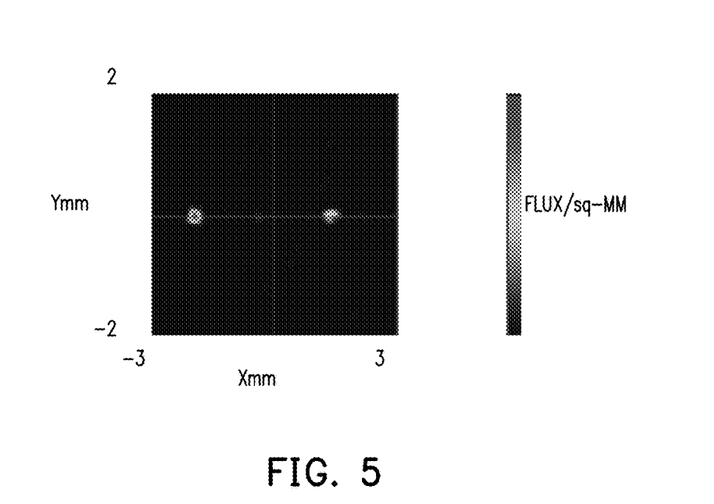
FIG. 5 is a simulated light distribution on a plurality of pixel regions of the fingerprint identification apparatus of FIG. 2.
Figure 6:
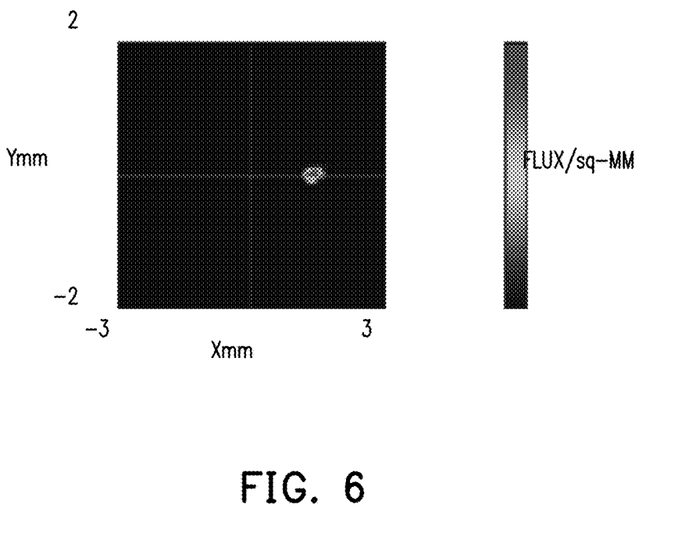
FIG. 6 is a simulated light distribution on a plurality of pixel regions of the fingerprint identification apparatus of FIG. 3.

FIG. 4 is a simulated light distribution on a plurality of pixel regions 120a of the fingerprint identification apparatus 100 of FIG. 1. FIG. 5 is a simulated light distribution on a plurality of pixel regions 120a of the fingerprint identification apparatus 100A of FIG. 2. FIG. 6 is a simulated light distribution on a plurality of pixel regions 120a of the fingerprint identification apparatus 100B of FIG. 3. The light sources configured to simulate FIG. 4, FIG. 5, and FIG. 6 have one divergence angles, such as 180°. It can be known from the comparison of FIG. 4, FIG. 5, and FIG. 6 that, when the diameter D, the spacing P, and the thickness H of the fingerprint identification apparatus B of FIG. 4 corresponding to FIG. 6 satisfy formula (1), the cross-talk issue of the fingerprint identification apparatus 100B is significantly alleviated.

Figure 7:
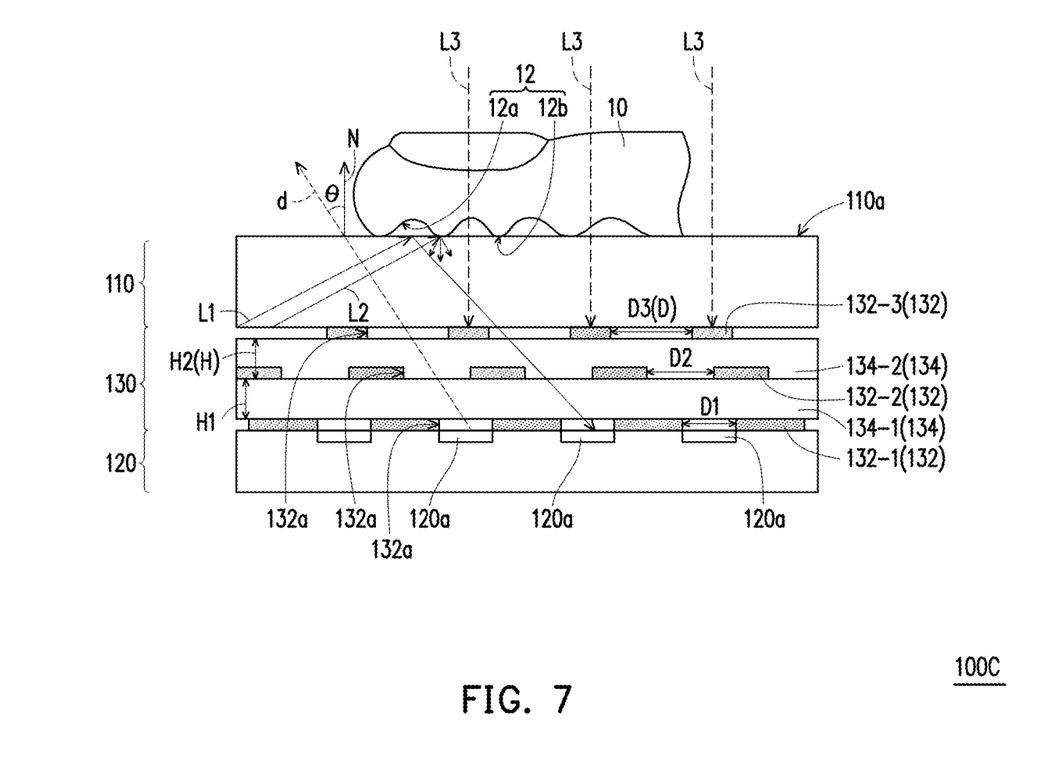
FIG. 7 is a cross section of a fingerprint identification apparatus of still yet another embodiment of the invention.

FIG. 7 is a cross section of a fingerprint identification apparatus of still yet another embodiment of the invention. Referring to FIG. 1 and FIG. 7, a fingerprint identification apparatus 100C is similar to the fingerprint identification apparatus 100, and the same or similar portions of the two are provided above and not repeated herein. The main difference between the fingerprint identification apparatus 100C and the fingerprint identification apparatus 100 is that, in the embodiment of FIG. 7, the diameters D1, D2, and D3 of the plurality of openings 132a corresponding to one pixel region 120a are gradually increased away from the image-capture device 120. The fingerprint identification apparatus 100C has similar effects and advantages as the fingerprint identification apparatus 100, and therefore the effects and advantages are not repeated herein.

Figure 8:
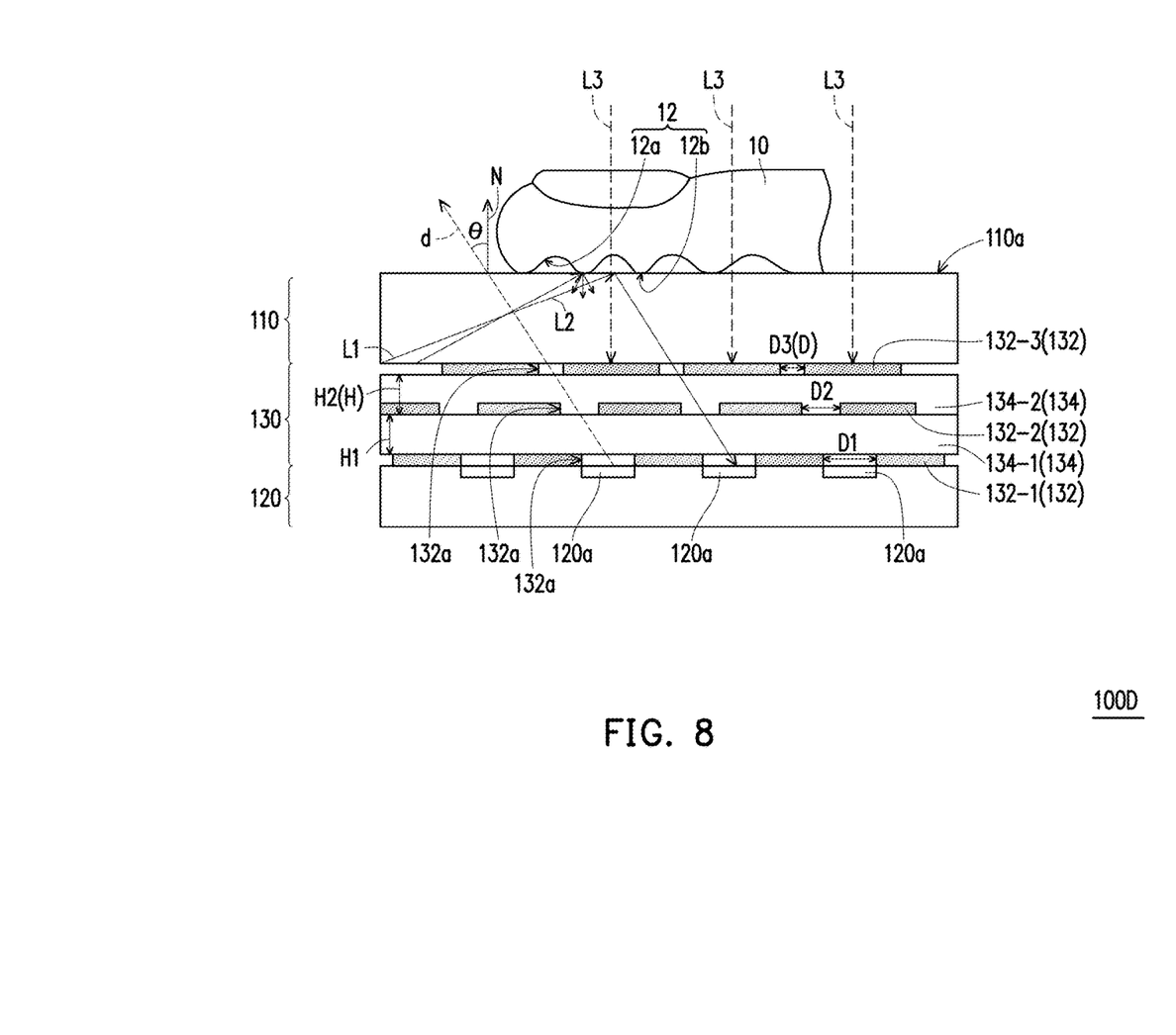
FIG. 8 is a cross section of a fingerprint identification apparatus of an embodiment of the invention.

FIG. 8 is a cross section of a fingerprint identification apparatus of an embodiment of the invention. Referring to FIG. 1 and FIG. 8, a fingerprint identification apparatus 100D is similar to the fingerprint identification apparatus 100, and the same or similar portions of the two are provided above and not repeated herein. The main difference between the fingerprint identification apparatus 100D and the fingerprint identification apparatus 100 is that, in the embodiment of FIG. 8, the diameters D1, D2, and D3 of the plurality of openings 132a corresponding to one pixel region 120a are gradually decreased away from the image-capture device 120. The fingerprint identification apparatus 100D has similar effects and advantages as the fingerprint identification apparatus 100, and therefore the effects and advantages are not repeated herein.

Figure 9:
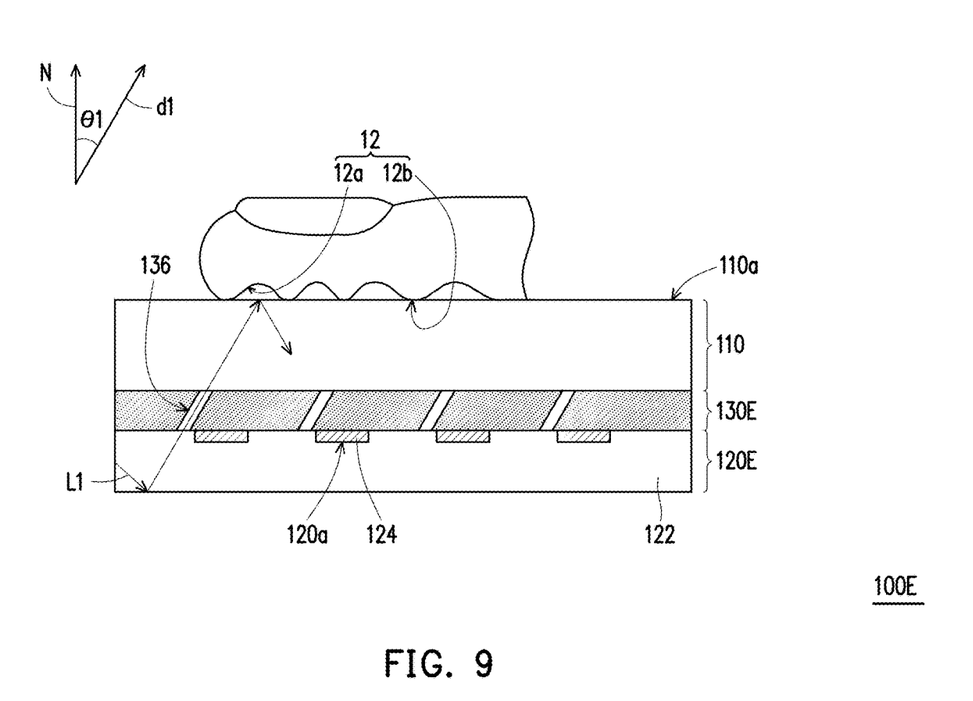
FIG. 9 is a cross section of a portion of a fingerprint identification apparatus of another embodiment of the invention.
Figure 10:
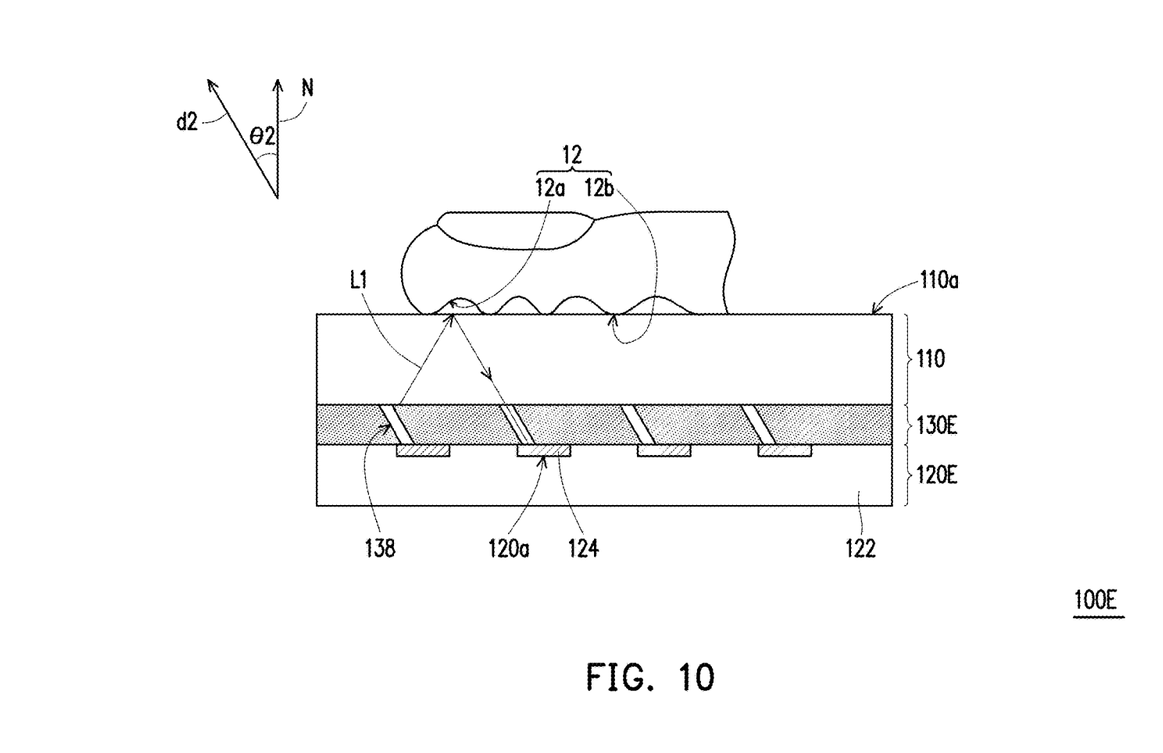
FIG. 10 is a cross section of another portion of the fingerprint identification apparatus of FIG. 9.
Figure 11:
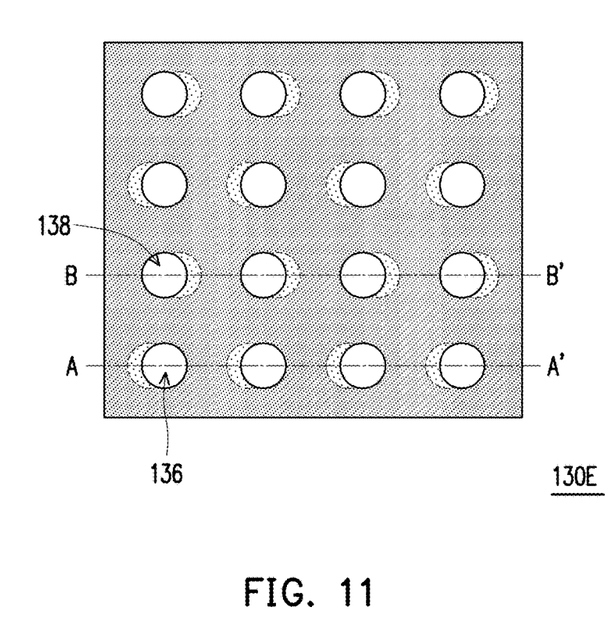
FIG. 11 is a top view of a collimator of the fingerprint identification apparatus of FIG. 9.

FIG. 9 is a cross section of a portion of a fingerprint identification apparatus of another embodiment of the invention. FIG. 10 is a cross section of another portion of the fingerprint identification apparatus of FIG. 9. FIG. 11 is a top view of a collimator of the fingerprint identification apparatus of FIG. 9. In particular, the cross section of a collimator 130E of FIG. 9 corresponds to the section line A-A' of FIG. 11, and the cross section of the collimator 130E of FIG. 10 corresponds to the section line B-B' of FIG. 11.

Referring to FIG. 9, FIG. 10, and FIG. 11, a fingerprint identification apparatus 100E includes a light-transmitting device 110 having a pressing surface 110a, an image-capture device 120E disposed opposite to the light-transmitting device 110 and having a plurality of pixel regions 120a, and a collimator 130E disposed between the light-transmitting device 110 and the image-capture device 120E. The collimator 130E has a plurality of first optical channels 136 and a plurality of second optical channels 138. The plurality of first optical channels 136 is parallel to one another and extended in the first oblique direction d1, wherein the first oblique direction d1 and the normal direction N of the pressing surface 110a have an included angle θ1, and 0°<θ1<90°. The plurality of second optical channels 138 is extended in the second oblique direction d2, wherein the second oblique direction d2 and the normal direction N of the pressing surface 110a have an included angle θ2, and 0°<θ2<90°. The first oblique direction d1 and the second oblique direction d2 are staggered.

In the present embodiment, 35°<θ1<85°, 35°<θ2<85°, and θ1 and θ2 can be different, but the invention is not limited thereto. In the present embodiment, the image-capture device 120E includes a light-transmitting carrier 122 having a plurality of pixel regions 120a and a plurality of photoelectric conversion structures 124 disposed in the plurality of pixel regions 120a of the light-transmitting carrier 122. For instance, the image-capture device 120E can be a glass-based sensor.

In the present embodiment, the sensing light beam L1 can pass through the light-transmitting carrier 122 of the image-capture device 120E and the first optical channels 136 of the collimator 130E in order to be transmitted toward the finger 12 located on the pressing surface 110a. In other words, the first optical channels 136 of the collimator 130E are configured to let the sensing light beam L1 emitted by a light source (not shown) pass through. In particular, since the first optical channels 136 are extended in the first oblique direction d1, the sensing light beam L1 passing through the first optical channels 136 can be obliquely (or in a more consistent direction) transmitted toward the finger 12, such that the image-capture device 120E can obtain a better fingerprint image. Moreover, the sensing light beam L1 reflected by the pressing surface 110a (and/or the sensing light beam L1 reflected by the peak 12b of the finger 12 and passing through the pressing surface 110a) passes through the second optical channels 138 of the collimator 130E to be transmitted to the pixel region 120a of the image-capture device 120E. Since the second optical channels 138 are extended in the second oblique direction d2, an ambient beam (such as sunlight) substantially perpendicularly incident on the pressing surface 110a does not readily pass through the second optical channels 138 and is transmitted to the image-sensing device 120E. As a result, the ambient beam readily interferes with the fingerprint 12 information carried by the sensing light beam L1 to increase the fingerprint 12 image quality.

As shown in FIG. 9, FIG. 10, and FIG. 11, in the present embodiment, the first optical channels 136 and the second optical channels 138 of the collimator 130E can be separated from each other and not connected to each other. However, the invention is not limited thereto, and in other embodiments, the first optical channels 136 and the second optical channels 138 can also be connected to one another, as described below with reference to FIG. 12 and FIG. 13.

Figure 12:
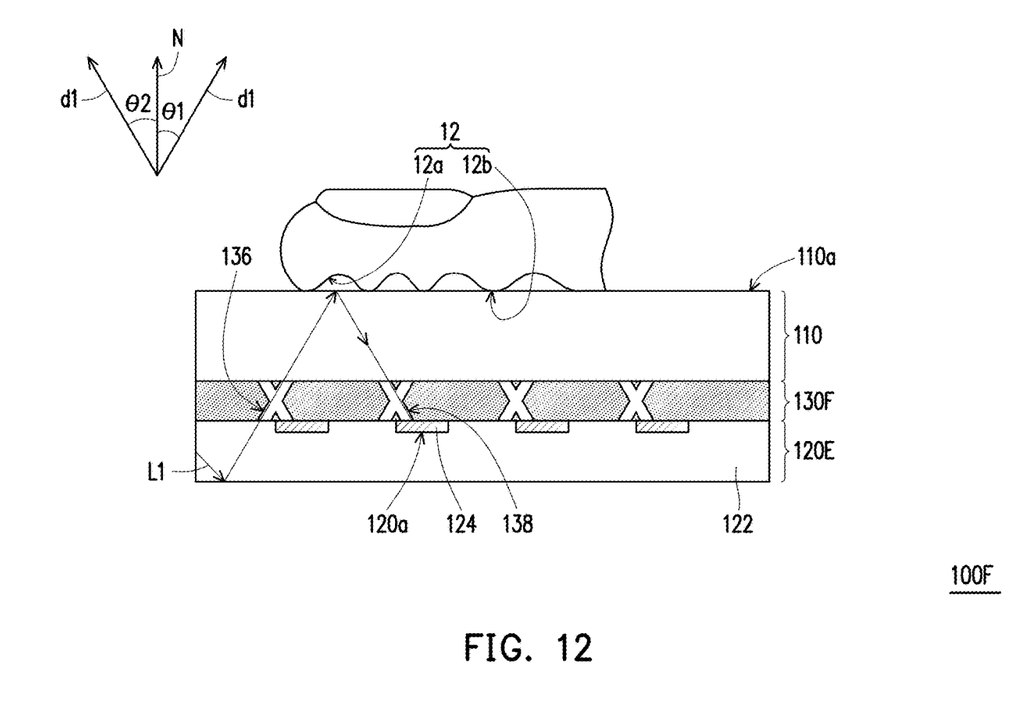
FIG. 12 is a cross section of a fingerprint identification apparatus of yet another embodiment of the invention.
Figure 13:
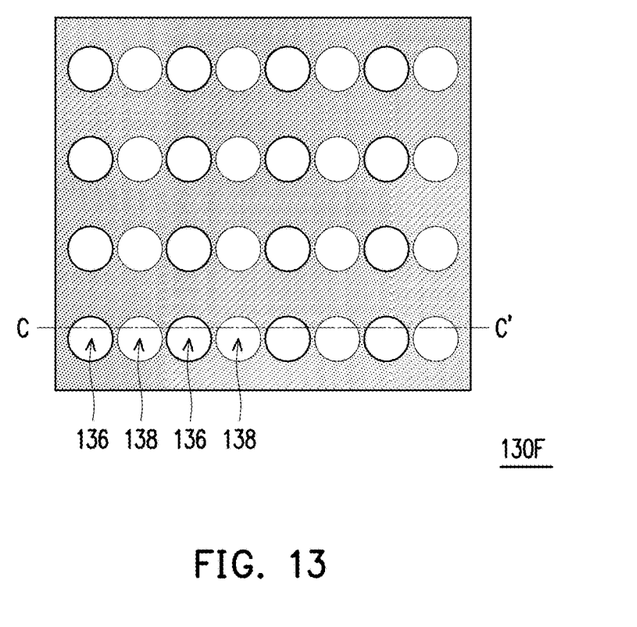
FIG. 13 is a top view of a collimator of the fingerprint identification apparatus of FIG. 12.

FIG. 12 is a cross section of a fingerprint identification apparatus of yet another embodiment of the invention. FIG. 13 is a top view of a collimator of the fingerprint identification apparatus of FIG. 12. In particular, the cross section of the collimator 130F of FIG. 12 corresponds to section line C-C' of FIG. 13. Referring to FIG. 12 and FIG. 13, a fingerprint identification apparatus 100F of the present embodiment is similar to the fingerprint identification apparatus 100E, and the difference between the two is that, the first optical channels 136 and the second optical channels 138 of a collimator 130F of the fingerprint identification apparatus 100F can cross each other and be connected to each other. The fingerprint identification apparatus 100F has similar effects and advantages as the fingerprint identification apparatus 100E, and therefore the effects and advantages are not repeated herein.

In the fingerprint identification apparatus 100F of FIG. 12, the first optical channels 136 are extended in a direction not parallel to the normal direction N of the pressing surface 110a (i.e., the first oblique direction d1), and the second optical channels 138 are also extended in a direction not parallel to the normal direction N of the pressing surface 110a (i.e., the first oblique direction d2). However, the invention is not limited thereto, and in another embodiment, one of the first optical channels 136 and the second optical channels 138 can be extended in a direction parallel to the normal direction N of the pressing surface 110a, and the other of the first optical channels 136 and the second optical channels 138 can be extended in a direction not parallel to the normal direction N of the pressing surface 110a. In short, in another embodiment, one of the first optical channels 136 and the second optical channels 138 can be disposed straight and the other of the first optical channels 136 and the second optical channels 138 can be disposed obliquely, wherein the optical channels disposed straight are, for instance, disposed in a non-fingerprint identification region (also non-visible region).

Based on the above, the fingerprint identification apparatus of an embodiment of the invention includes a light-transmitting device having a pressing surface, an image-capture device disposed opposite to the light-transmitting device, and a collimator disposed between the light-transmitting device and the image-capture device. The collimator includes a plurality of light-shielding layers and a plurality of light-transmitting layers that are alternately stacked. Each of the light-shielding layers has a plurality of openings respectively corresponding to a plurality of pixel regions of the image-capture device. Openings of the plurality of light-shielding layers corresponding to one pixel region are arranged along an oblique direction. The plurality of openings of the plurality of light-shielding layers arranged along an oblique direction forms a plurality of optical channels, and since the optical channels are obliquely disposed, an ambient beam does not readily pass through the optical channels and is transmitted to the image-sensing device. Accordingly, the ambient beam does not readily interfere with the fingerprint information carried by the sensing light beam, and therefore fingerprint image-capture quality can be increased.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A fingerprint identification apparatus, comprising:
a light-transmitting device having a pressing surface;
an image-capture device disposed opposite to the light-transmitting device and having a plurality of pixel regions; and
a collimator disposed between the light-transmitting device and the image-capture device, wherein the collimator has a plurality of first optical channels and a plurality of second optical channels, the first optical channels are extended in a first oblique direction, the first oblique direction and a normal direction of the pressing surface have an included angle $\theta1$, $0°<\theta1<90°$, the second optical channels are extended in a second oblique direction, the second oblique direction and the normal direction of the pressing surface have an included angle $\theta2$, $0°<\theta2<90°$, and the first oblique direction and the second oblique direction are staggered.

2. The fingerprint identification apparatus of claim 1, wherein a sensing light beam passes through the first optical channels to be transmitted toward a finger on the pressing surface; and the sensing light beam from the pressing surface passes through the second optical channels to be transmitted to the pixel regions of the image-capture device.

3. The fingerprint identification apparatus of claim 1, wherein $35°<\theta1<85°$.

4. The fingerprint identification apparatus of claim 1, wherein $35°<\theta2<85°$.

5. The fingerprint identification apparatus of claim 1, wherein the included angle $\theta1$ and the included angle $\theta2$ are different.

6. The fingerprint identification apparatus of claim 1, wherein the image-capture device comprises:
a light-transmitting carrier having the pixel regions; and
a plurality of photoelectric conversion structures disposed in the pixel regions of the light-transmitting carrier.

* * * * *